United States Patent

Uehara

(12)
(10) Patent No.: US 6,335,810 B1
(45) Date of Patent: Jan. 1, 2002

(54) OPTICAL ADM APPARATUS AND AN ADM OPTICAL TRANSMISSION SYSTEM INCLUDING THE OPTICAL ADM APPARATUS

(75) Inventor: Daisuke Uehara, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/200,744

(22) Filed: Nov. 30, 1998

(30) Foreign Application Priority Data

Nov. 28, 1997 (JP) ............................................. 9-329202

(51) Int. Cl.⁷ ............................ H04B 10/08; H04J 14/02
(52) U.S. Cl. ........................ 359/127; 359/110; 359/124; 359/128
(58) Field of Search ...................... 359/110, 124–134, 359/127, 128

(56) References Cited

U.S. PATENT DOCUMENTS

| 5,812,289 | A | * | 9/1998 | Tomooka et al. | ............ 359/115 |
| 5,963,312 | A | * | 10/1999 | Roberts | ....................... 356/73.1 |
| 6,075,633 | A | * | 6/2000 | Deguchi et al. | ............. 359/133 |
| 6,094,442 | A | * | 7/2000 | Okamoto et al. | ........... 370/506 |
| 6,108,123 | A | * | 8/2000 | Kinoshita | .................... 359/337 |
| 6,115,516 | A | * | 9/2000 | Watson et al. | ................. 385/24 |
| 6,229,631 | B1 | * | 5/2001 | Sato et al. | .................... 359/110 |

FOREIGN PATENT DOCUMENTS

| JP | 2-224538 | 9/1990 |
| JP | 3-214936 | 9/1991 |
| JP | 6-37717 | 2/1994 |
| JP | 6-311139 | 11/1994 |
| JP | 9-83495 | 3/1997 |
| JP | 9-270770 | 10/1997 |
| JP | 9-289488 | 11/1997 |
| JP | 10-246832 | 9/1998 |
| JP | 11-23892 | 1/1999 |

OTHER PUBLICATIONS

Japanese Office Action dated Sep. 20, 2000, with partial translation.
Reference 1: Ryoichi Sugioka, "Digital PBX Nyumon", 1987, Ohmsha, Ltd., pp. 40–41.
Reference 2: Minoru Akiyama et al., "Digital Denwa Kokan", 1986, Sangyo Tosho Kabushikigaisha, pp. 54–58.

(List continued on next page.)

*Primary Examiner*—Jason Chan
*Assistant Examiner*—Dalzid Singh
(74) *Attorney, Agent, or Firm*—McGinn & Gibb, PLLC

(57) ABSTRACT

An optical ADM apparatus (10) receives a WDM optical signal comprising first through n-th main signal components ($\lambda 1$–$\lambda n$) and a monitor/control signal component ($\lambda sv$). A monitor/control signal terminator (5) terminates the monitor/control signal component to produce first through n-th monitor/control signals. When a destination node ID represented by one of the first through the n-th monitor/control signals is coincident with an ID of the optical ADM apparatus (10), the monitor/control signal processor (8) produces a specifying signal specifying, as a specified main signal component, one of the first through the n-th main signal components ($\lambda 1$–$\lambda n$) that corresponds to the above-mentioned one of the first through the n-th monitor/control signals. The monitor/control signal processor (8) further produces the first through the n-th monitor/control signals in which an origination node ID corresponding to the specified main signal component is rewritten into the ID of the optical ADM apparatus (10) while the destination node ID corresponding to the specified main signal component is rewritten into an ID of a different node. When the specified signal is supplied from the monitor/control signal processor (8), an ADM unit (2) drops or separates the specified main signal component alone from the first through the n-th main signal components to output the specified main signal component.

7 Claims, 9 Drawing Sheets

OTHER PUBLICATIONS

Reference 3: Hiroshi Iketani et al., "Denshi Kokani", 1972, 6th Edition, Publisher: Kabushikigaisha Giken, Sales: Ohmsha, Ltd., pp. 244–251.

Japanese Office Action dated Jun. 21, 2000, with partial translation.

Fujitsu, vol. 48, No. 5, 1997–99, pp. 436–441.

Jonathan B. Postel, "Simple Mail Transfer Protocol", Aug. 1982, pp. 1–70.

* cited by examiner

OPTICAL ADM APPARATUS AND AN ADM OPTICAL TRANSMISSION SYSTEM INCLUDING THE OPTICAL ADM APPARATUS

BACKGROUND OF THE INVENTION

This invention relates to a WDM (wavelength division multiplexing) optical transmission system and, in particular, to an optical ADM (add-drop multiplexing) node and an optical cross-connect node (i.e., an optical path switching node) used in the WDM optical transmission system.

In each of Japanese Unexamined Patent Publications (JP-A) Nos. 3-214936 (214936/1991) and 6-37717 (37717/1994), disclosure is made of an optical repeater for repeating a WDM optical signal having a main signal component (channel) and a monitor/control signal component different in wavelength from the main signal component. In particular, the latter publication teaches to use the monitor/control signal component in carrying state information representative of a normal or abnormal state of the optical repeater.

Conventional WDM optical transmission systems include a point-to-point system, an optical ADM ring system, and an optical cross-connect system. In the point-to-point system and the optical ADM ring system, each optical ADM node holds channel information such as "which channel is to be separated (dropped)/inserted (added)", "which node a separated channel has passed through?", and "which node an inserted channel is to be transmitted to?". In accordance with the information, control is carried out.

In the optical cross-connect system also, each optical cross-connect node (i.e., optical path switching node) holds channel information such as "which node a passing channel has passed through?" and "which node each channel is to be transmitted to?". In accordance with the information, control is carried out.

The above-mentioned conventional WDM optical transmission systems can not flexibly deal with modification of the destination of each channel and modification of the separated/inserted channel.

In order to achieve the effective use of transmission paths and the flexibility, a variable channel structure is preferred rather than use of a fixed channel (wavelength) assigned to each node. The variable channel structure requires an information transfer arrangement for transferring the above-mentioned channel information. However, such information transfer arrangement is not defined as yet.

SUMMARY OF THE INVENTION

It is therefore an object of this invention to provide an optical ADM apparatus (optical ADM node) capable of implementing a WDM optical transmission system (point-to-point system or optical ADM ring system) in which a monitor/control signal component is used in carrying control information for a main signal component (channel).

It is another object of this invention to provide a WDM optical transmission system using the above-mentioned optical ADM apparatus (optical ADM node).

It is still another object of this invention to provide an optical path switching apparatus (optical cross-connect node) capable of implementing a WDM optical transmission system (optical cross-connect system) in which a monitor/control signal component is used in carrying control information for a main signal component (channel).

Other objects of this invention will become clear as the description proceeds.

According to an aspect of this invention, there is provided an optical ADM (add-drop multiplexing) apparatus responsive to a WDM (wavelength division-multiplexed) optical signal comprising first through n-th (n being an integer not less than 2) main signal components different in wavelength from one another and a single monitor/control signal component different in wavelength from each of the first through the n-th main signal components, wherein:

the monitor/control signal component carries first through n-th monitor/control signals which represent origination apparatus identifiers of origination apparatuses of the first through the n-th main signal components and destination apparatus identifiers of destination apparatuses of the first through the n-th main signal components in correspondence to the first through the n-th main signal components;

the optical ADM apparatus comprises:

a divider for dividing the WDM optical signal into the first through the n-th main signal components and the monitor/control signal component;

a monitor/control signal terminator coupled to the divider for terminating the monitor/control signal component to produce the first through the n-th monitor/control signals;

a monitor/control signal processor connected to the monitor/control signal terminator for producing, when the destination apparatus identifier represented by one of the first through the n-th monitor/control signals is coincident with an identifier of the optical ADM apparatus, a specifying signal specifying, as a specified main signal component, one of the first through the n-th main signal components that corresponds to the one of the first through the n-th monitor/control signals, the monitor/control signal processor further producing the first through the n-th monitor/control signals with the origination apparatus identifier corresponding to the specified main signal component rewritten into the identifier of the optical ADM apparatus and with the destination apparatus identifier corresponding to the specified main signal component rewritten into a different apparatus identifier of a different apparatus which is different from the optical ADM apparatus;

an ADM unit coupled to the divider and connected to the monitor/control signal processor for dropping, when receives the specifying signal from the monitor/control signal processor, the specified main signal component from the first through the n-th main signal components and for producing, when receives a new main signal component equal in wavelength to the specified main signal component, the first through the n-th main signal components with the new main signal component added as the specified main signal component;

an ADM terminal station coupled to the ADM unit for receiving the specified main signal component from the ADM unit and for transmitting to the ADM unit the new main signal component equal in wavelength to the specified main signal component;

a monitor/control signal component generator connected to the monitor/control signal processor for producing the monitor/control signal component which carries the first through the n-th monitor/control signals produced by the monitor/control signal processor; and an optical combiner coupled to the ADM unit and the monitor/control signal component generator for producing another WDM optical signal comprising the first through the n-th main signal components produced by the ADM unit and the monitor/control signal component produced by the monitor/control signal component generator.

Preferably, the monitor/control signal processor produces, when each of the destination apparatus identifiers represented by the first through the n-th monitor/control signals is not coincident with the identifier of the optical ADM apparatus, a pass signal and for transmitting to the monitor/control signal component generator the first through the n-th monitor/control signals with the identifier of the optical ADM apparatus added to each of the first through the n-th monitor/control signals as an intermediate apparatus identifier.

In this event, the ADM unit further has a function of transmitting, when receives the pass signal from the monitor/control signal processor, the first through the n-th main signal components from the divider to the optical combiner as they are.

According to another aspect of this invention, there is provided an optical path switching apparatus responsive to a WDM (wavelength division-multiplexed) optical signal comprising first through n-th (n being an integer not less than 2) main signal components different in wavelength from one another and a single monitor/control signal component different in wavelength from each of the first through the n-th main signal components, wherein:

the monitor/control signal component carries first through n-th monitor/control signals which represent, in correspondence to the first through the n-th main signal components, intermediate apparatus identifiers of intermediate apparatuses through which the first through the n-th main signal components are passed;

the optical path switching apparatus comprising:

a divider for dividing the WDM optical signal into the first through the n-th main signal components and the monitor/control signal component;

a monitor/control signal terminator coupled to the divider for terminating the monitor/control signal component to produce the first through the n-th monitor/control signals;

a monitor/control signal processor connected to the monitor/control signal terminator for producing, on the basis of the intermediate apparatus identifiers represented by the first through the n-th monitor/control signals and an identifier of the optical path switching apparatus, a specifying signal specifying next apparatuses to which the first through the n-th main signal components are to be delivered, respectively, and for producing the first through the n-th monitor/control signals with the identifier of the optical path switching apparatus added to each of the first through the n-th monitor/control signals as the intermediate apparatus identifier;

a monitor/control signal component generator connected to the monitor/control signal processor for producing the monitor/control signal component which carries the first through the n-th monitor/control signals produced by the monitor/control signal processor; and an optical path switch coupled to the divider and the monitor/control signal component generator and connected to the monitor/control signal processor for transmitting first through n-th WDM optical signals comprising the first through the n-th main signal components and the monitor/control signal component from the monitor/control signal component generator, respectively, to the next apparatuses specified by the specifying signal supplied from the monitor/control signal processor, respectively.

DESCRIPTION OF THE PREFERRED EMBODIMENTS

Figure 1:
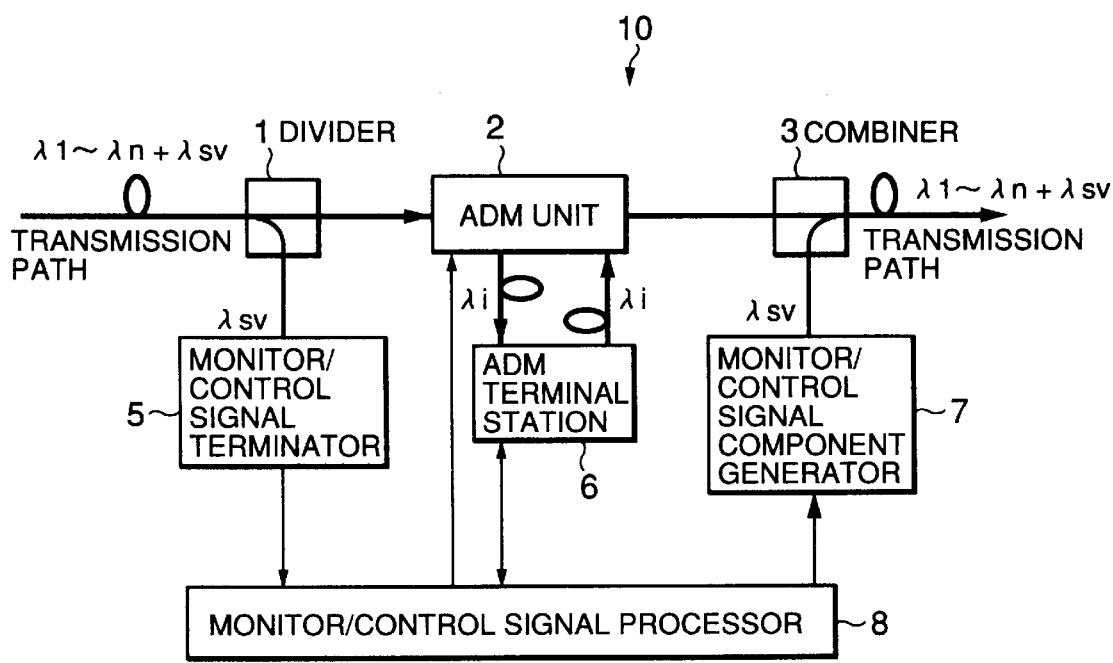
FIG. 1 is a block diagram of an optical ADM apparatus (optical ADM node) according to a first embodiment of this invention.

Now, description will be made about several preferred embodiments of this invention with reference to the drawing.

Referring to FIG. 1, an optical ADM apparatus or optical ADM node 10 according to a first embodiment of this invention is supplied from a transmission path with a WDM optical signal comprising first through n-th (n being an integer not less than 2) main signal components $\lambda 1$ through $\lambda n$ different in wavelength from one another and a single monitor/control signal component $\lambda sv$ different in wavelength from each of the first through the n-th main signal components $\lambda 1$ through $\lambda n$.

Figure 2:
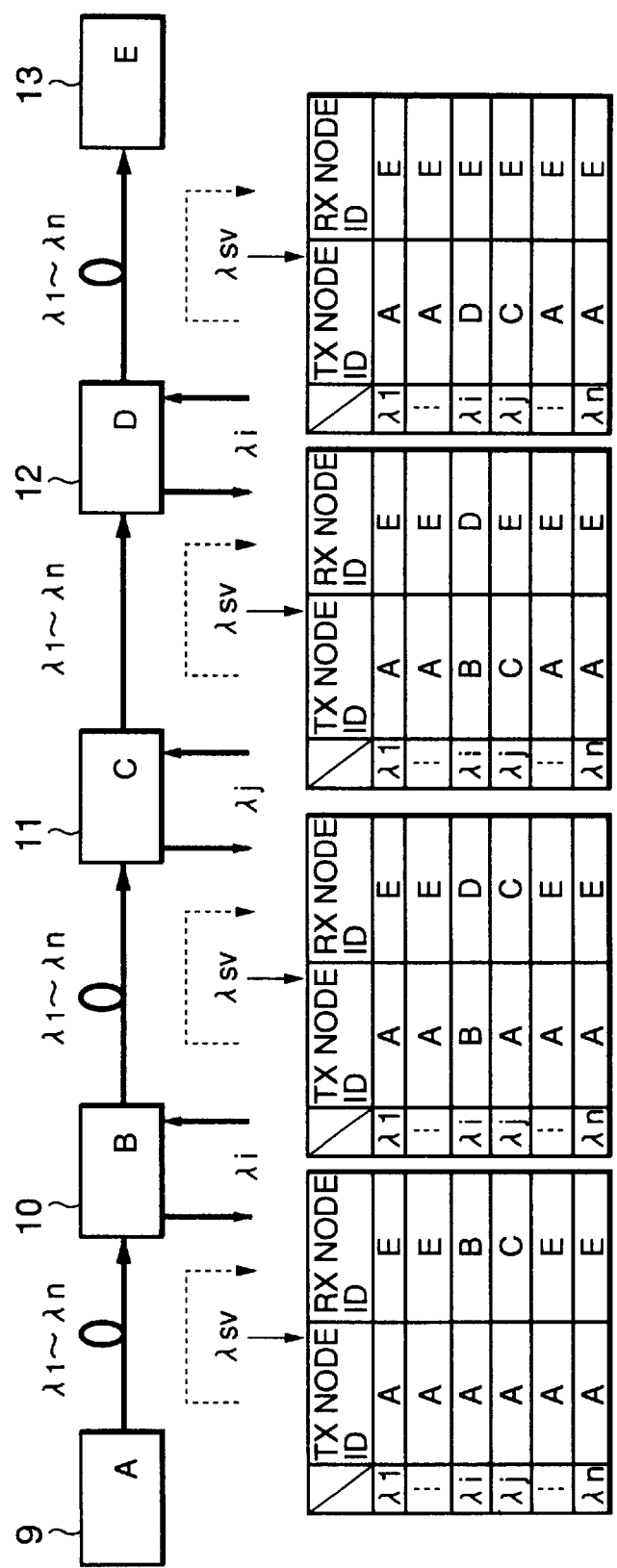
FIG. 2 is a view for describing the optical ADM apparatus illustrated in FIG. 1.

Referring to FIG. 2, the monitor/control signal component $\lambda sv$ supplied to the optical ADM node 10 carries first through n-th monitor/control signals which represent origination node IDs (identifiers) of origination nodes of the first through the n-th main signal components $\lambda 1$ through $\lambda n$ and destination node IDs (identifiers) of destination nodes of the first through the n-th main signal components $\lambda 1$ through $\lambda n$.

Returning back to FIG. 1, the optical ADM node 10 comprises a divider 1 for dividing the WDM optical signal into the first through the n-th main signal components $\lambda 1$ through $\lambda n$ and the monitor/control signal component $\lambda sv$.

The divider 1 is coupled to a monitor/control signal terminator 5 for terminating the monitor/control signal component $\lambda sv$ to produce the first through the n-th monitor/control signals.

The monitor/control signal terminator 5 is connected to a monitor/control signal processor 8. When one of the destination node IDs that is represented by a particular one of the first through the n-th monitor/control signals is coincident with a current node ID which is an ID (depicted by B in FIG. 2) of the optical ADM node 10, the monitor/control signal processor 8 produces a specifying signal specifying as a specified main signal component a corresponding one of the first through the n-th main signal components λ1 through λn that corresponds to the particular one of the first through the n-th monitor/control signals. In FIG. 2, the monitor/control signal component λsv supplied to the optical ADM node 10 is shown as a leftmost one of four tables. As seen from the table, the i-th main signal component λi has the destination node ID coincident with the current node ID (B in FIG. 2) and is therefore specified as the specified main signal component. In addition, the monitor/control signal processor 8 produces the first through the n-th monitor/control signals in which the origination and the destination node IDs corresponding to the specified main signal component λi are rewritten into the current node ID (B in FIG. 2) and an ID of another apparatus or node (D in FIG. 2), respectively, and the current node ID is added as an intermediate node ID to each of the first through the n-th monitor/control signals except the particular one. The intermediate node ID will later be described.

The divider 1 is also coupled to an ADM unit 2 which is connected to the monitor/control signal processor 8. When supplied from the monitor/control signal processor 8 with the specifying signal, the ADM unit 2 separates the specified main signal component λi alone from the first through the n-th main signal components λ1 through λn to deliver the specified main signal component λi to an ADM terminal station 6 which will later be described. In addition, the ADM unit 2 receives a new main signal component equal in wavelength to the specified main signal component λi and produces the first through the n-th main signal components λ1 through λn with the new main signal component inserted as the specified main signal component λi.

The ADM terminal station 6 is coupled to the ADM unit 2 and serves to receive the specified main signal component λi from the ADM unit 2 and to transmit to the ADM unit 2 the new main signal component equal in wavelength to the specified main signal component λi.

The monitor/control signal processor 8 is connected to a monitor/control signal component generator 7 for producing the monitor/control signal component λsv carrying the first through the n-th monitor/control signals from the monitor/control signal processor 8.

An optical combiner 3 is coupled to the ADM unit 2 and the monitor/control signal component generator 7. The optical combiner 3 combines the first through the n-th main signal components λ1 through λn from the ADM unit 2 and the monitor/control signal component λsv from the monitor/control signal component generator 7 to produce the WDM optical signal.

When none of the destination node IDs represented by the first through the n-th monitor/control signals is coincident with the current node ID, the monitor/control signal processor 8 produces a pass signal and supplies the monitor/control signal component generator 7 with the first through the n-th monitor/control signals with the current node ID added as the intermediate node ID to each of the first through the n-th monitor/control signals. The intermediate node ID will later be described in detail.

When the pass signal is supplied from the monitor/control signal processor 8, the ADM unit 2 transfers to the optical combiner 3 the first through the n-th main signal components λ1 through λn from the divider 1 without any change.

Referring to FIG. 2, a point-to-point system as a WDM optical transmission system will be described in detail. The point-to-point system includes the optical ADM node 10, a WDM optical terminal station 9 for transmitting the WDM optical signal to the optical ADM node 10, optical ADM nodes 11 and 12 similar in structure to the optical ADM node 10, and a WDM optical terminal station 13 for receiving the WDM optical signal from the optical ADM node 12.

Figure 3:
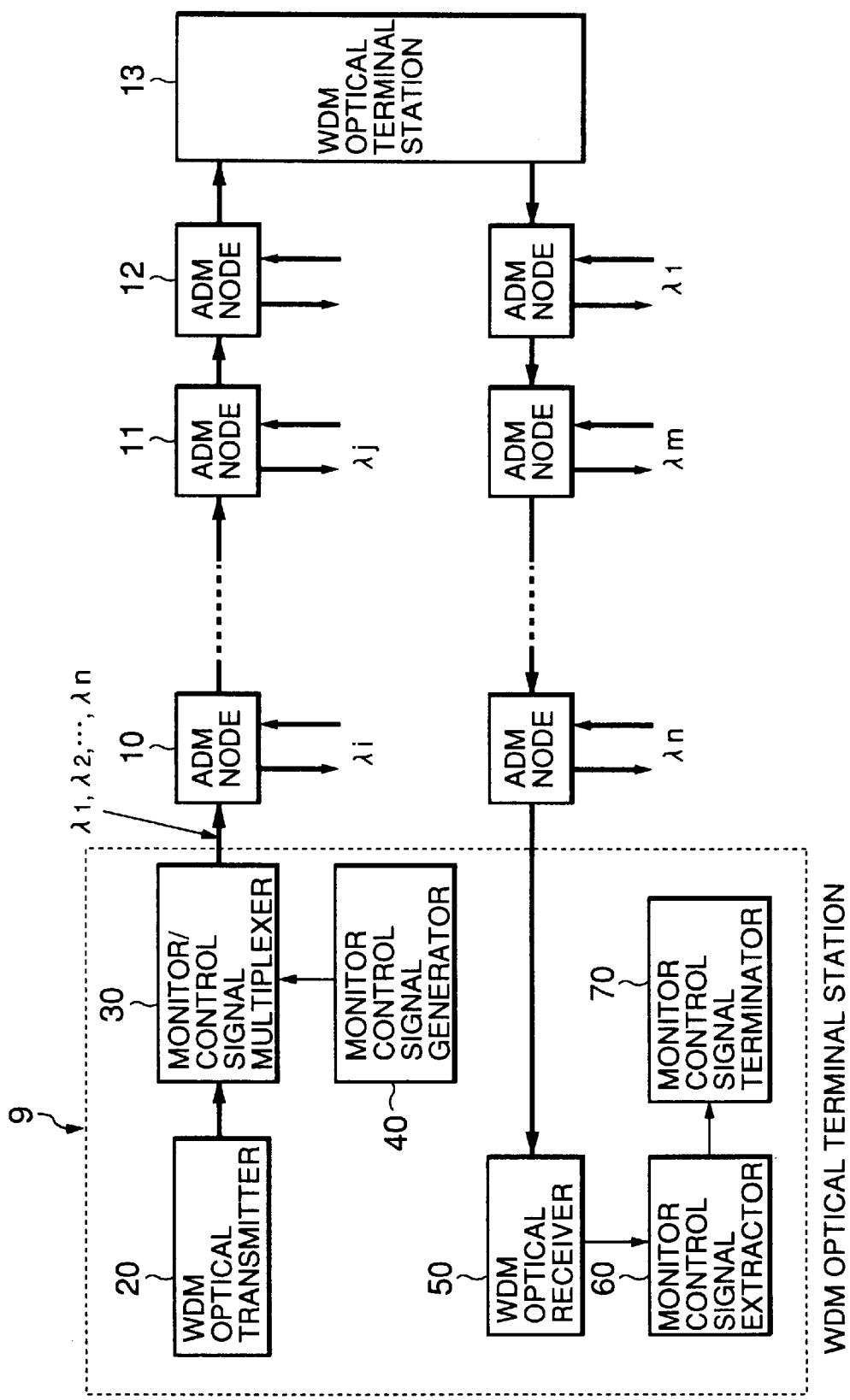
FIG. 3 is a block diagram of a WDM optical transmission system (point-to-point system) according to a second embodiment of this invention.

Referring to FIG. 3, another point-to-point system as a WDM optical transmission system according to a second embodiment of this invention comprises similar parts designated by like reference numerals. In FIG. 3, a WDM optical terminal station 9 comprises a WDM optical transmitter 20 for producing and transmitting a WDM optical signal in which optical signals of all channels (main signal components) are wavelength-division multiplexed, a monitor/control signal generator 40 for producing a data signal including an origination node ID for each channel and an intermediate node ID of an optical ADM node through which each channel is delivered, a monitor/control signal multiplexer 30 for wavelength-division multiplexing upon a main signal the data signal from the monitor/control signal generator 40, a WDM optical receiver 50 for receiving the WDM optical signal from a transmission path and separating/terminating each channel, a monitor/control signal extractor 60 for extracting a monitor/control signal component multiplexed on the main signal, and a monitor/control signal terminator 70 for terminating the monitor/control signal component from the monitor/control signal extractor 60 and identifying the intermediate node ID of the optical ADM node through which each channel has passed. The optical ADM node 10 is responsive to an output of the WDM optical terminal station 9 and carries out extraction/termination and production/multiplexing of monitor/control signals. Likewise, each of ADM nodes 11 and 12 at subsequent stages performs the similar operation. Finally, the WDM optical terminal station 13 terminates the monitor/control signals.

Figure 4:
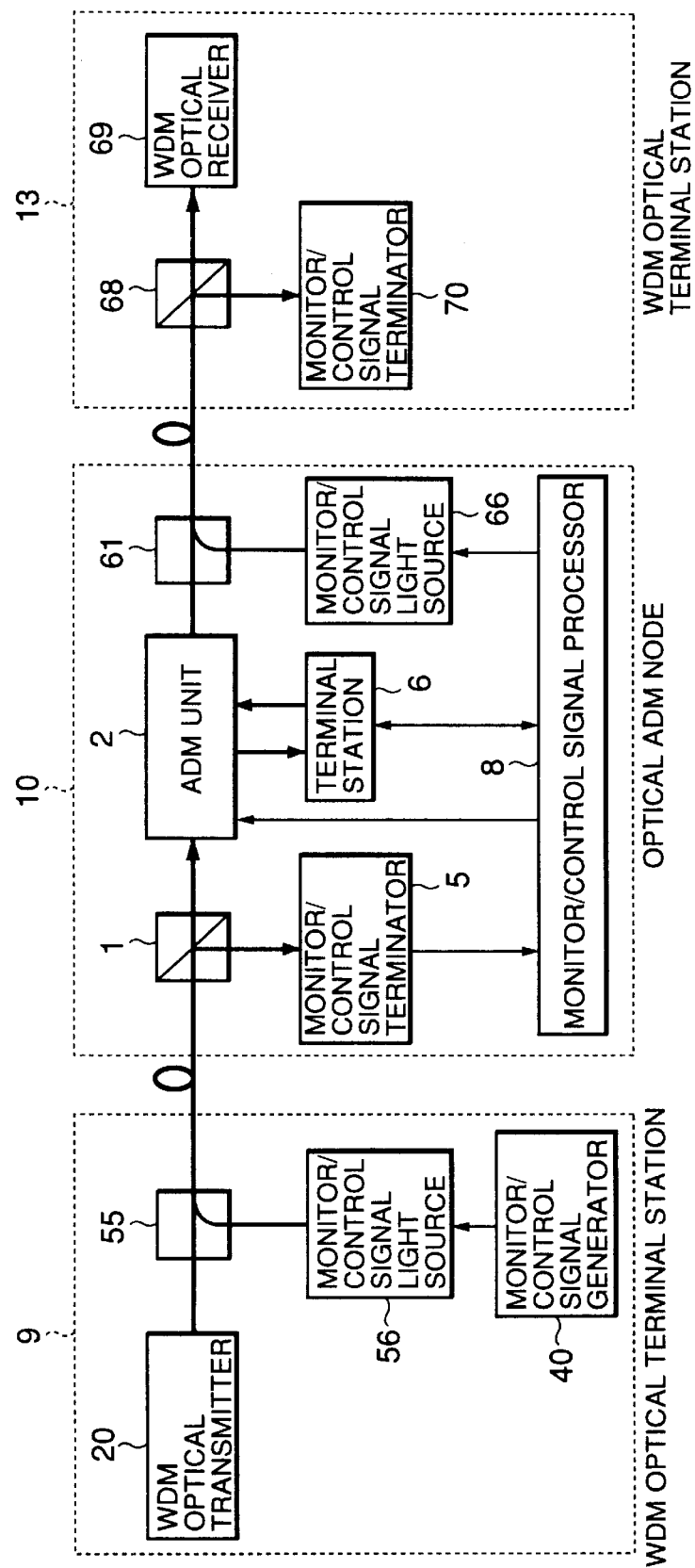
FIG. 4 is a block diagram of a WDM optical transmission system (point-to-point system) according to a third embodiment of this invention.

Referring to FIG. 4, a still another point-to-point system as a WDM optical transmission system according to a third embodiment of this invention comprises similar parts designated by like reference numerals. In FIG. 4, a WDM optical terminal apparatus 9 comprises a WDM optical transmitter 20 which transmits a WDM optical signal. A monitor/control signal from a monitor/control signal generator 40 is supplied to a monitor/control signal light source 56 to produce a modulated optical signal modulated by the monitor/control signal and different in wavelength from a main signal. A combiner 55 combines the WDM optical signal from the WDM optical transmitter 20 and the modulated optical signal from the monitor/control signal light source 56 to produce an optical output signal which is transmitted to a transmission path.

An optical ADM node 10 receives the optical output signal from the WDM optical terminal station 9. The optical output signal is separated by a divider 1 into a main signal component and a monitor/control signal component. The monitor/control signal component thus separated is delivered to a monitor/control signal terminator 5 which supplies a monitor/control signal processor 8 with a monitor/control signal carrying ADM control information, origination node information, destination node information, intermediate node information, and wavelength information for each channel. In response to the ADM control information, the monitor/control signal processor 8 specifies a channel to be subjected to ADM and produces an ADM control signal which is supplied to an ADM unit 2. Supplied with the ADM control signal, the ADM unit 2 separates the channel which is terminated by an ADM terminal station 6. The ADM terminal station 6 supplies the ADM unit 2 with a new signal component equal in wavelength to the separated channel. In the monitor/control signal processor 8, the monitor/control signal is processed in the following manner. For a channel to be made to pass through the optical ADM node 10 without separation, a current node ID which is an ID of the optical ADM node 10 is added to the intermediate node information as history or route information to indicate the passage through the optical ADM node 10. On the other hand, for a channel to be inserted at the optical ADM node 10, the origination node ID, the destination node ID, and the intermediate node ID are added. The monitor/control signal thus processed is delivered to a monitor/control signal light source 66 (corresponding to the monitor/control signal component generator 7 in FIG. 1). The monitor/control signal light source 66 produces a modulated optical signal modulated by the monitor/control signal supplied thereto. An optical combiner 3 combines the optical signals from the ADM unit 2 and the monitor/control signal light source 66 to produce an optical output signal which is delivered to the transmission path. The optical output signal of the optical ADM node 10 is supplied to a WDM optical terminal station 13 as an input optical signal. In the WDM optical terminal station 13, the optical input signal is divided by a divider 68 into a main signal component and a monitor/control signal component. The main signal component is delivered to a WDM receiver 69. The monitor/control signal component is delivered to a monitor/control signal terminator 70 to enable reception of the origination node information, the destination node information, the intermediate node information, and the wavelength information.

Figure 5:
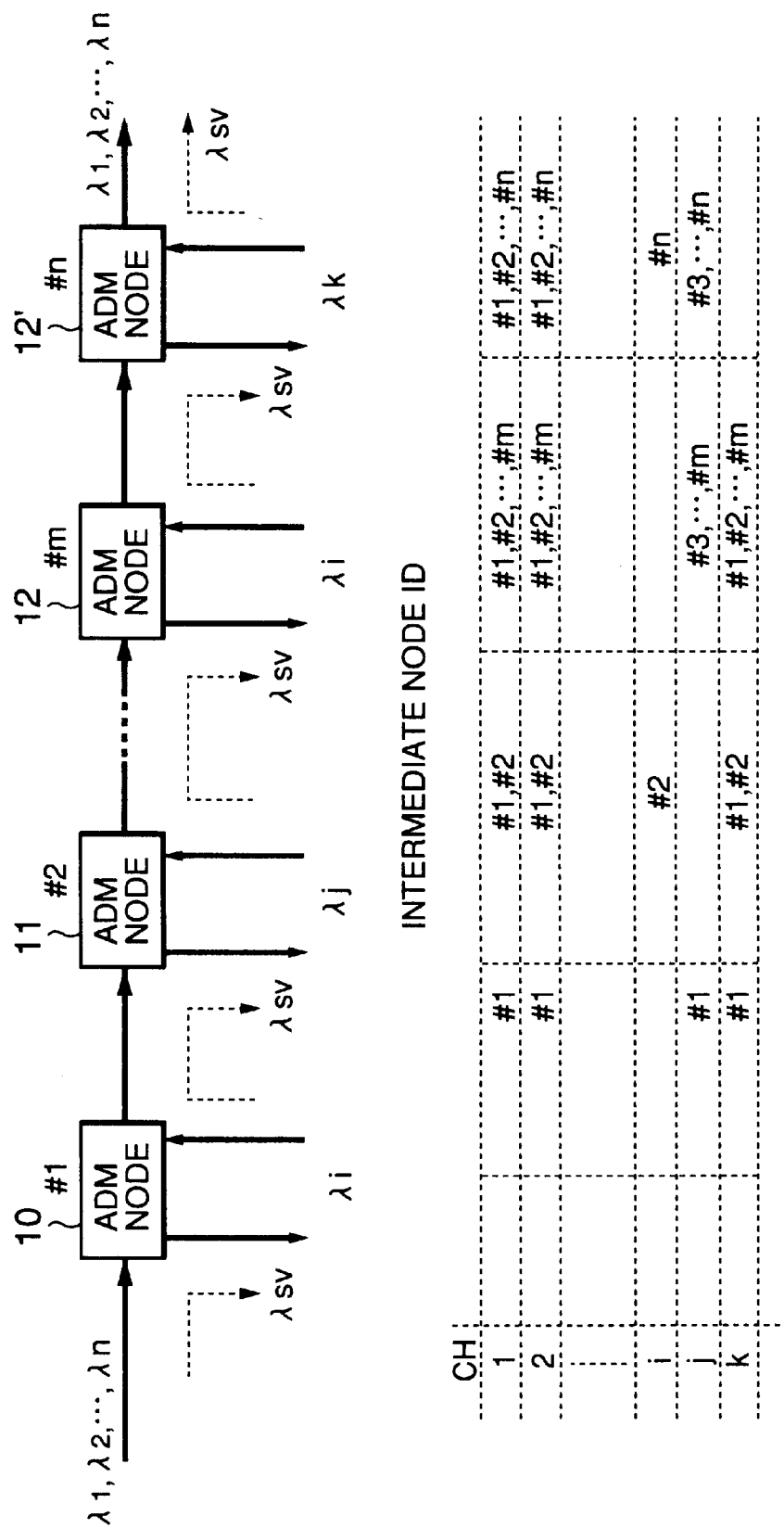
FIG. 5 is a block diagram of a WDM optical transmission system (point-to-point system) according to a fourth embodiment of this invention.

Referring to FIG. 5, a yet another point-to-point system as a WDM optical transmission system according to a fourth embodiment of this invention comprises similar parts designated by like reference numerals. In FIG. 5, a WDM signal from a transmission path is supplied to an optical ADM node 10 where a channel i is subjected to ADM. The ADM is controlled with reference to a monitor/control signal component λsv simultaneously received as a monitor/control signal. The optical ADM node 10 and similar optical ADM nodes 11, 12, . . . , and 12' are connected in a multistage fashion and have node IDs #1, #2, . . . , #m, and #n, respectively. In the optical ADM node 10, an origination node ID and a destination node ID in the monitor/control signal are rewritten into #1 and #m, respectively, with respect to the channel i and the node ID #1 of the optical ADM node 10 is added with respect to other channels to produce a new monitor/control signal. The new monitor/control signal is delivered to the optical ADM node 11 located downstream. In the optical ADM node 11, a channel j is subjected to ADM with reference to the new monitor/control signal supplied from the optical ADM node 10. In the similar manner, the origination node ID and the destination node ID are rewritten with respect to the channel j and the node ID #2 of the optical ADM node 11 is added with respect to other channels to produce a renewed monitor/control signal. The renewed monitor/control signal is delivered to a next optical ADM node located downstream. Similar operation is repeated while the WDM signal is transferred from one node to another. In the optical ADM node 12, the channel i is subjected to ADM with reference to an updated monitor/control signal supplied from a preceding optical ADM node located upstream. Herein, the control signal for the channel i includes the information inserted at the optical ADM node 10. In the optical ADM node 12, the origination node ID and the destination node ID are rewritten in the similar manner with respect to the channel i and the node ID #m of the optical ADM node 12 is added with respect to other channels to produce a latest monitor/control signal. The latest monitor/control signal is delivered to the optical ADM node 12' located downstream. In the node 12', similar operation is repeated.

For each of those channels which are not subjected to ADM, an intermediate node ID is added in each node as illustrated in the figure until a particular node where ADM is performed is reached.

Figure 6:
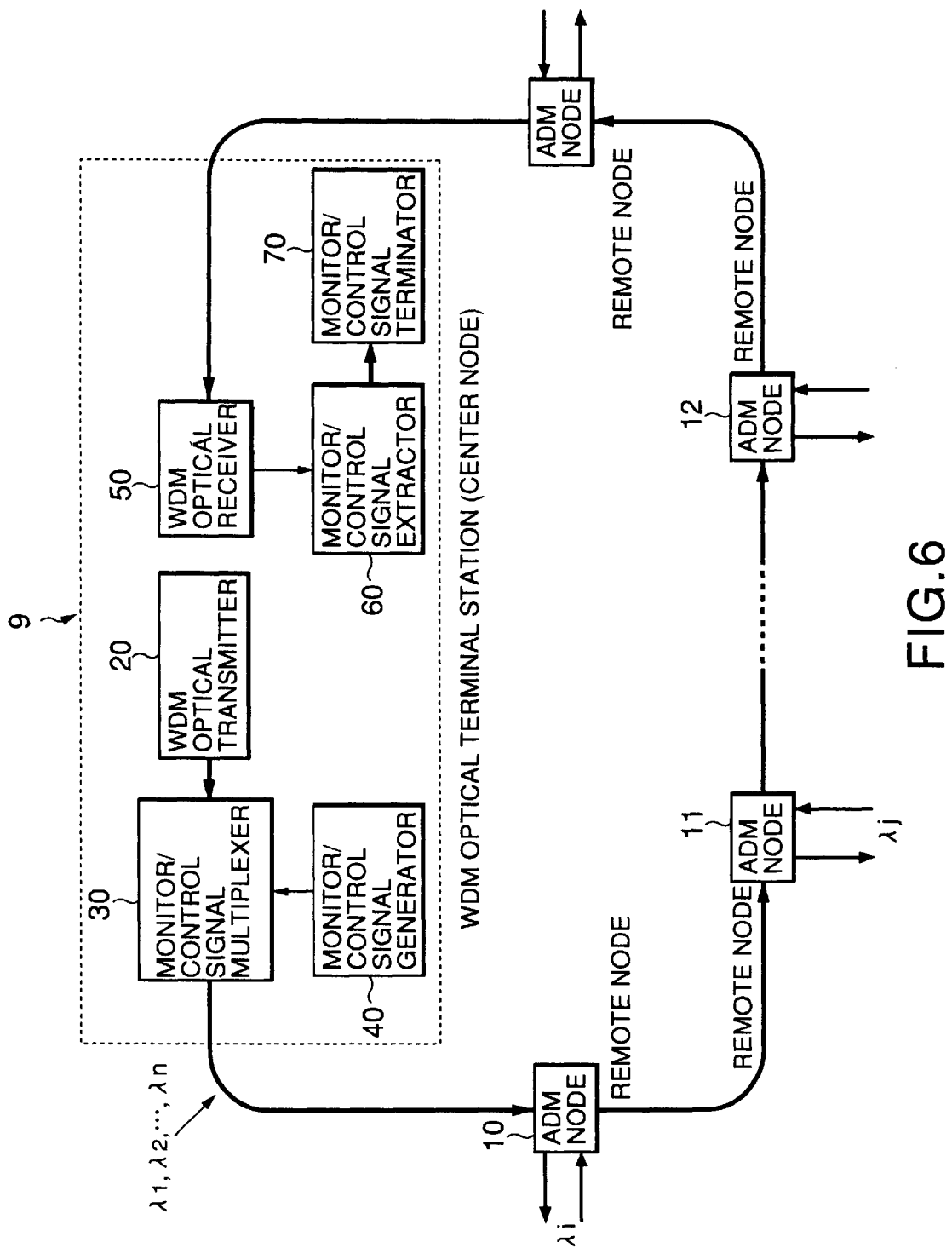
FIG. 6 is a block diagram of a WDM optical transmission system (optical ADM ring system) according to a fifth embodiment of this invention.

Referring to FIG. 6, an optical ADM ring system as a WDM optical transmission system according to a fifth embodiment of this invention comprises similar parts designated by like reference numerals. In FIG. 6, a WDM optical terminal station 9 serves as a center node while optical ADM nodes 10 through 12 serve as remote nodes.

Figure 7:
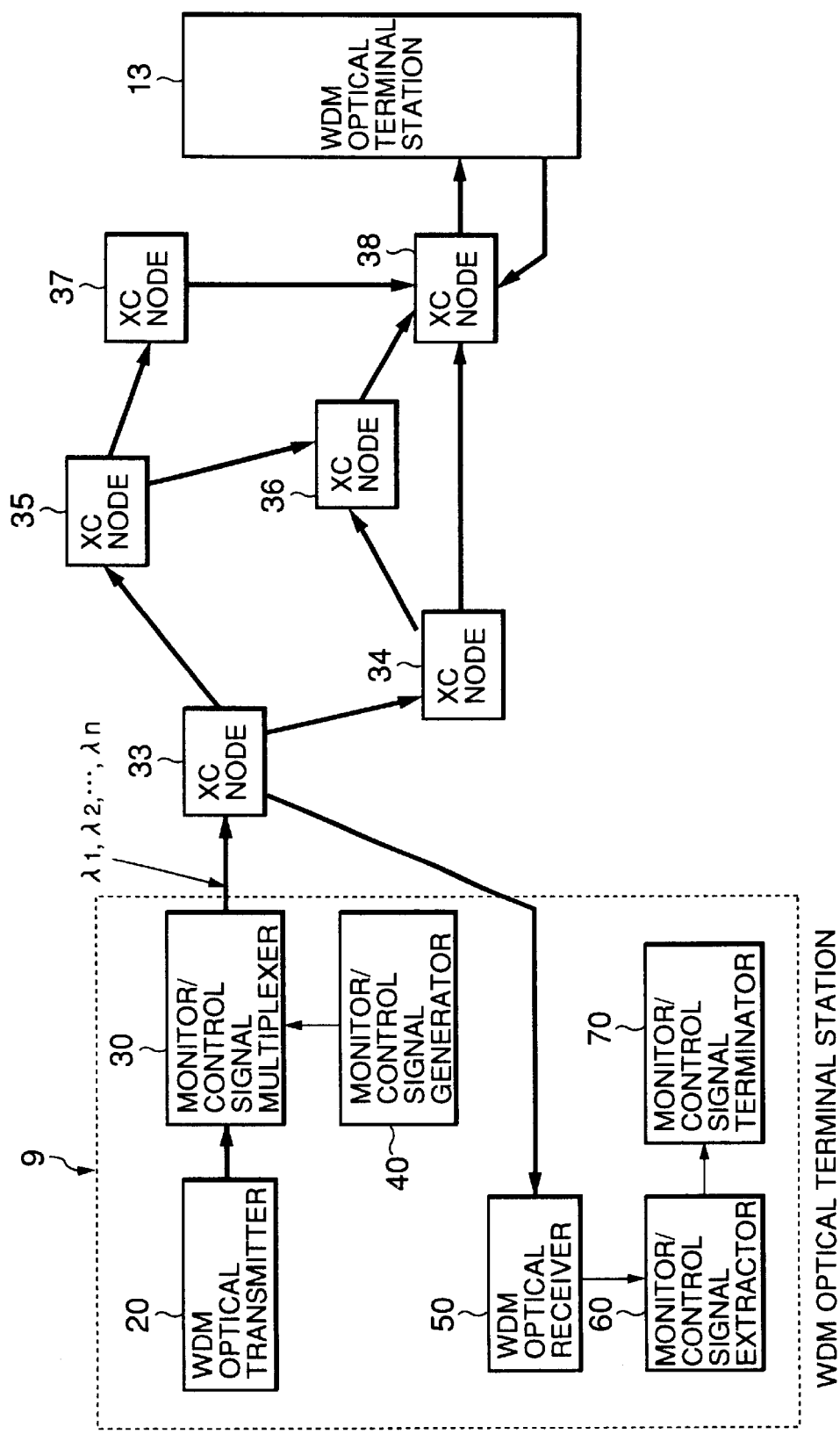
FIG. 7 is a block diagram of a WDM optical transmission system (optical cross-connect system) according to a sixth embodiment of this invention.

Referring to FIG. 7, an optical cross-connect system as a WDM optical transmission system according to a sixth embodiment of this invention comprises similar parts designated by like reference numerals. In FIG. 7, the optical cross-connect system comprises an optical path switch or a cross-connect (XC) node 33 for receiving a WDM optical signal comprising first through n-th (n being an integer not smaller than 2) main signal components $\lambda 1$ through $\lambda n$ different in wavelength from one another and a monitor/control signal component $\lambda sv$ different in wavelength from each of the first through the n-th main signal components $\lambda 1$ through $\lambda n$, and similar XC nodes 34 through 38. The monitor/control signal component $\lambda sv$ carries first through n-th monitor/control signals representing intermediate node IDs identifying intermediate units through which the first through the n-th main signal components $\lambda 1$ through $\lambda n$ are delivered, respectively.

Figure 8:
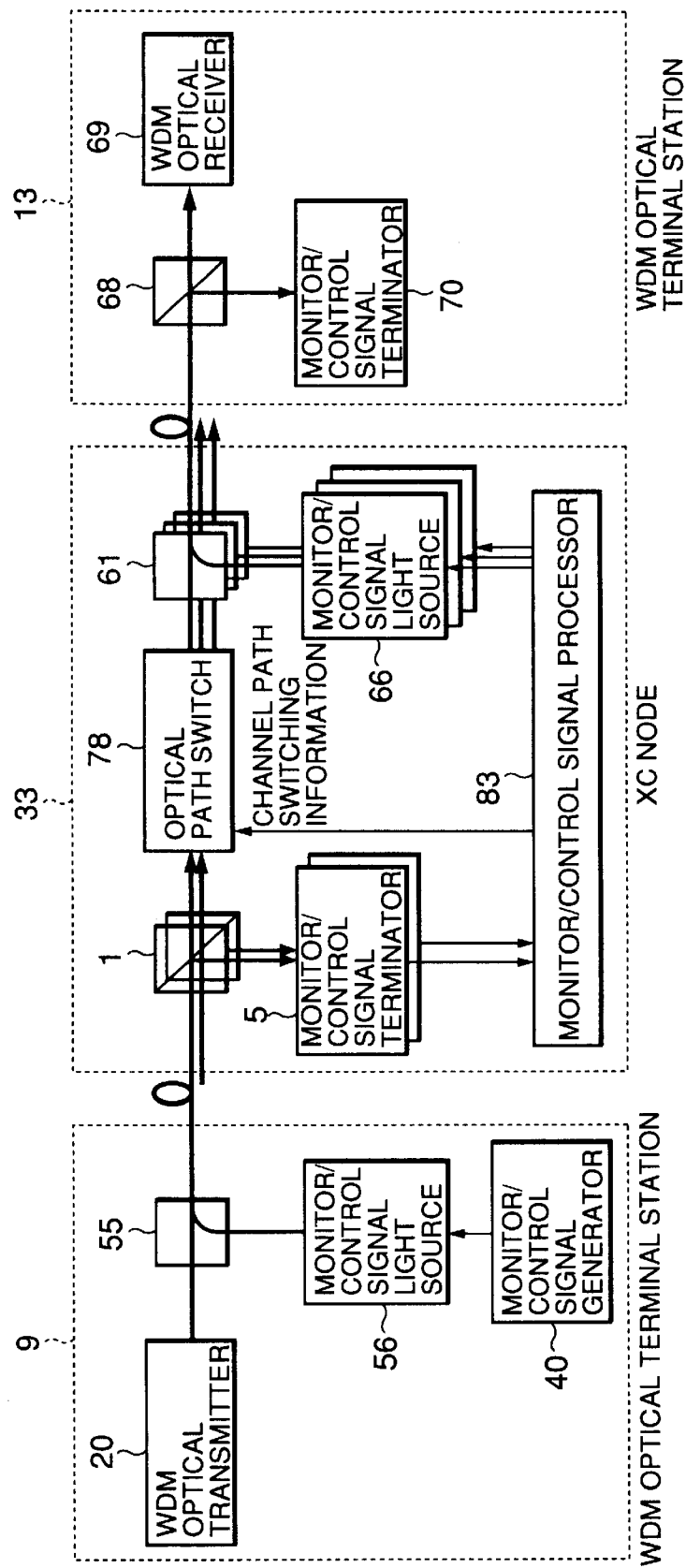
FIG. 8 is a block diagram of a WDM optical transmission system (optical cross-connect system) according to a seventh embodiment of this invention.

Referring to FIG. 8, another optical cross-connect system as a wavelength division multiplexing optical transmission system according to a seventh embodiment of this invention comprises similar parts designated by like reference numerals. In FIG. 8, an optical path switch or a cross-connect (XC) node 33 comprises a divider 1 for dividing a WDM optical signal into first through n-th main signal components $\lambda 1$ through $\lambda n$ and a monitor/control signal component $\lambda sv$.

A divider 1 is connected to a monitor/control signal terminator 5 for terminating the monitor/control signal component $\lambda sv$ to produce first through n-th monitor/control signals.

The monitor/control signal terminator 5 is connected to a monitor/control signal processor 83. With reference to intermediate node IDs represented by the first through the n-th monitor/control signals and a node ID of the cross-connect (XC) node 33, the monitor/control signal processor 83 produces a specifying signal for specifying next nodes to which the first through the n-th main signal components $\lambda 1$ through $\lambda n$ are to be delivered, respectively, and produces the first through the n-th monitor/control signals with the node ID of the cross-connect (XC) node 33 added to each of the first through the n-th monitor/control signals as the intermediate node ID.

The monitor/control signal processor 83 is connected to a monitor/control signal light source 66. The monitor/control signal light source 66 serves as a monitor/control signal component generator for producing a monitor/control signal component carrying the first through the n-th monitor/control signals from the monitor/control signal processor 83.

An optical path switch 78 is coupled to the divider 1 and the monitor/control signal light source (monitor/control signal component generator) 66 and is also connected to the monitor/control signal processor 83. The optical path switch 78 transmits, to the next units specified by the specifying signal from the monitor/control signal processor 83, first through n-th WDM optical signals with the monitor/control signal component from the monitor/control signal light source (monitor/control signal component generator) 66 added to each of the first through the n-th main signal components λ1 through λn.

Specifically, the cross-connect (XC) node 33 receives an optical signal from a WDM optical terminal station 9. The optical signal is separated by the divider 1 into the main signal components and the monitor/control signal component. The monitor/control signal component is supplied to the monitor/control signal terminator 5 which delivers origination node information, destination node information, intermediate node information, and wavelength information for each channel to the monitor/control signal processor 83. With reference to the destination node information, the monitor/control signal processor 83 specifies a switching state of channel paths and delivers a switching control signal to the optical path switch 78. In response to the switching control signal, the optical path switch 78 switches the channel paths to deliver the optical signal to a transmission path. The monitor/control signal processor 83 delivers to the monitor/control signal light source 66 the monitor/control signals with the node ID of the cross-connect (XC) node 33 added to the intermediate node information for each channel as history information representing the passage through the cross-connect (XC) node 33. The monitor/control signal light source 66 produces a modulated optical signal modulated by the monitor/control signal supplied thereto. An optical combiner 61 combines the optical signals from the optical path switch 78 and the modulated optical signal from the monitor/control signal light source 66 to produce a combined optical signal which is delivered to the transmission path.

Figure 9:
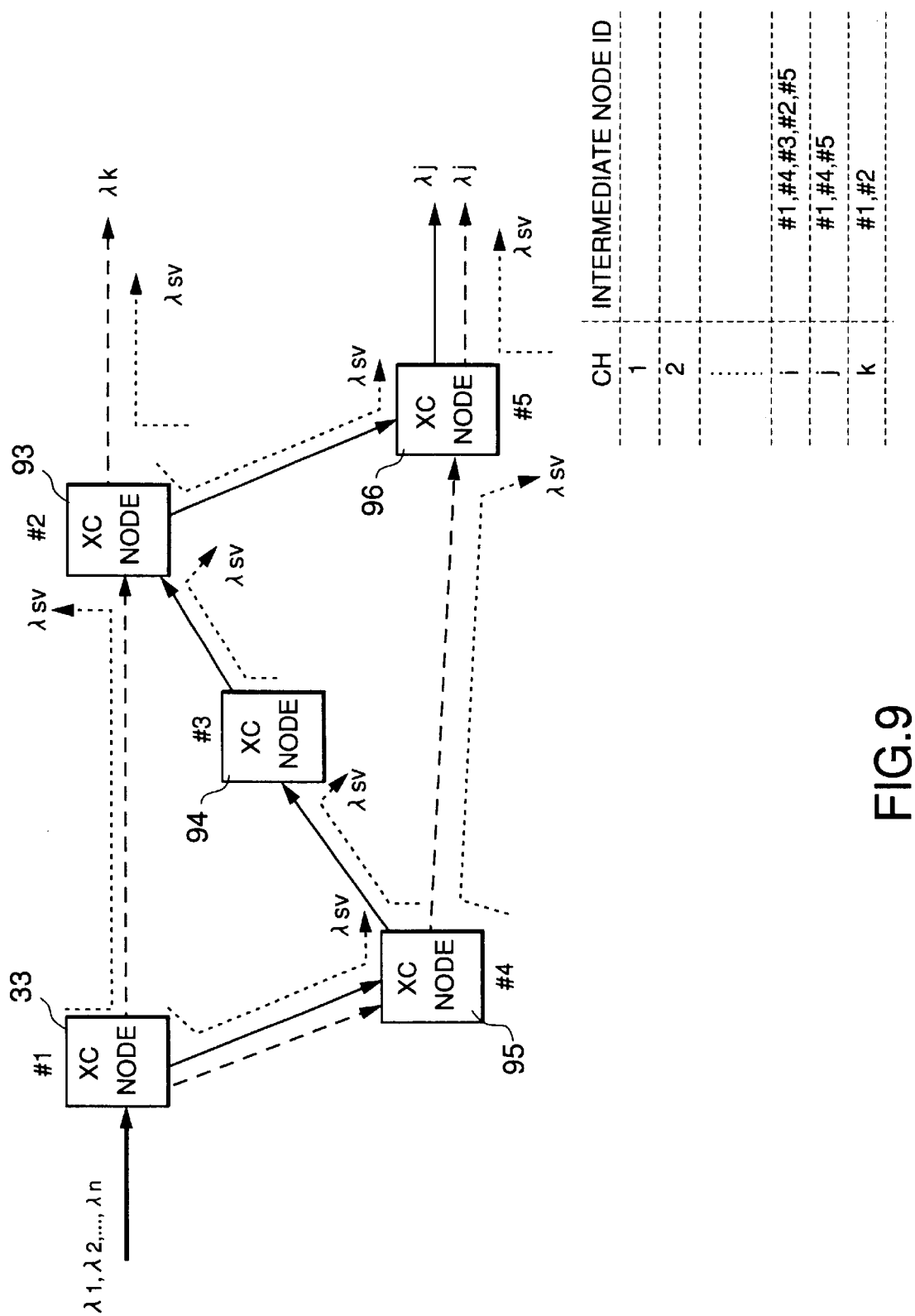
FIG. 9 is a block diagram of a WDM optical transmission system (optical cross-connect system) according to an eighth embodiment of this invention.

Referring to FIG. 9, an optical cross-connect systems a WDM optical transmission system according to an eighth embodiment of this invention comprises similar parts designated by like reference numerals. In FIG. 9, a WDM signal is supplied from a transmission path to an optical path switch or a cross-connect (XC) node 33. For each of channels i and j, a path to a node 95 is selected while a path to a node 93 is selected for a channel k. Switching of optical paths is carried out with reference to a monitor/control signal component λsv simultaneously received. The monitor/control signals are assigned between nodes in one-to-one correspondence to the channels so that the destination can always be identified with respect to each channel of each node. In the illustrated example, the channel i passes through the node 95 and then through the nodes 94, 93, and 96 to be outputted. The channel j passes through the node 95 and then through the node 96 to be outputted. The channel k is outputted after passing through the node 93. In each node, the node ID through which each channel is delivered is added as an intermediate node ID to each of the monitor/control signals. Thus, it is possible for a next node to identify the channel paths.

As described above, according to this invention, there is provided the optical ADM apparatus (optical ADM node) achieving the WDM optical communication system (point-to-point system or optical ADM ring system) in which the monitor/control signal component is used to carry the control information for the main signal components (channels).

According to this invention, there is also provided the WDM optical transmission system using the above-mentioned optical ADM apparatus (optical ADM node).

According to this invention, there is provided the optical path switch (optical cross-connect node) achieving the WDM optical transmission system (optical cross-connect system) in which the monitor/control signal component is used to carry the control information for the main signal components (channels).

What is claimed is:

1. An optical ADM (add-drop multiplexing) apparatus responsive to a WDM (wavelength division-multiplexed) optical signal comprising first through n-th (n being an integer not less than 2) main signal components different in wavelength from one another and a single monitor/control signal component different in wavelength from each of said first through said n-th main signal components, wherein:

said monitor/control signal component carries first through n-th monitor/control signals which represent origination apparatus identifiers of origination apparatuses of said first through said n-th main signal components and destination apparatus identifiers of destination apparatuses of said first through said n-th main signal components in correspondence to said first through said n-th main signal components;

said optical ADM apparatus comprising:

a divider for dividing said WDM optical signal into said first through said n-th main signal components and said monitor/control signal component;

a monitor/control signal terminator coupled to said divider for terminating said monitor/control signal component to produce said first through said n-th monitor/control signals;

a monitor/control signal processor connected to said monitor/control signal terminator for producing, when the destination apparatus identifier represented by one of said first through said n-th monitor/control signals is coincident with an identifier of said optical ADM apparatus, a specifying signal specifying, as a specified main signal component, one of said first through said n-th main signal components that corresponds to said one of the first through the n-th monitor/control signals, said monitor/control signal processor further producing said first through said n-th monitor/control signals with the origination apparatus identifier corresponding to said specified main signal component rewritten into the identifier of said optical ADM apparatus and with the destination apparatus identifier corresponding to said specified main signal component rewritten into a different apparatus identifier of a different apparatus which is different from said optical ADM apparatus;

an ADM unit coupled to said divider and connected to said monitor/control signal processor for dropping, when receives said specifying signal from said monitor/control signal processor, said specified main signal component from said first through said n-th main signal components and for producing, when receives a new main signal component equal in wavelength to said specified main signal component, said first through said n-th main signal components with said new main signal component added as said specified main signal component;

an ADM terminal station coupled to said ADM unit for receiving said specified main signal component from said ADM unit and for transmitting to said ADM unit said new main signal component equal in wavelength to said specified main signal component;

a monitor/control signal component generator connected to said monitor/control signal processor for producing said monitor/control signal component which carries said first through said n-th monitor/control signals produced by said monitor/control signal processor; and an optical combiner coupled to said ADM unit and said monitor/control signal component generator for producing another WDM optical signal comprising said first through said n-th main signal components produced by said ADM unit and said monitor/control signal component produced by said monitor/control signal component generator.

2. An optical ADM apparatus as claimed in claim 1, wherein:

said monitor/control signal processor produces, when each of the destination apparatus identifiers represented by said first through said n-th monitor/control signals is not coincident with the identifier of said optical ADM apparatus, a pass signal and for transmitting to said monitor/control signal component generator said first through said n-th monitor/control signals with the identifier of said optical ADM apparatus added to each of said first through said n-th monitor/control signals as an intermediate apparatus identifier;

said ADM unit further having a function of transmitting, when receives said pass signal from said monitor/control signal processor, said first through said n-th main signal components from said divider to said optical combiner as they are.

3. A WDM optical transmission system comprising said optical ADM apparatus claimed in claim 2 and a WDM optical terminal station for transmitting the WDM optical signal to said optical ADM apparatus.

4. A WDM optical transmission system comprising said optical ADM apparatus claimed in claim 2 and a WDM optical terminal station for receiving the other WDM optical signal from said optical ADM apparatus.

5. A WDM optical transmission system comprising said optical ADM apparatus claimed in claim 1 and a WDM optical terminal station for transmitting the WDM optical signal to said optical ADM apparatus.

6. A WDM optical transmission system comprising said optical ADM apparatus claimed in claim 1 and a WDM optical terminal station for receiving the other WDM optical signal from said optical ADM apparatus.

7. An optical path switching apparatus responsive to a WDM (wavelength division-multiplexed) optical signal comprising first through n-th (n being an integer not less than 2) main signal components different in wavelength from one another and a single monitor/control signal component different in wavelength from each of said first through said n-th main signal components, wherein:

said monitor/control signal component carries first through n-th monitor/control signals which represent, in corrrespondence to said first through said n-th main signal components, intermediate apparatus identifiers of intermediate apparatuses through which said first through said n-th main signal components are passed;

said optical path switching apparatus comprising:

a divider for dividing said WDM optical signal into said first through said n-th main signal components and said monitor/control signal component;

a monitor/control signal terminator coupled to said divider for terminating said monitor/control signal component to produce said first through said n-th monitor/control signals;

a monitor/control signal processor connected to said monitor/control signal terminator for producing, on the basis of said intermediate apparatus identifiers represented by said first through said n-th monitor/control signals and an identifier of said optical path switching apparatus, a specifying signal specifying next apparatuses to which said first through said n-th main signal components are to be delivered, respectively, and for producing said first through said n-th monitor/control signals with the identifier of said optical path switching apparatus added to each of said first through said n-th monitor/control signals as said intermediate apparatus identifier;

a monitor/control signal component generator connected to said monitor/control signal processor for producing said monitor/control signal component which carries said first through said n-th monitor/control signals produced by said monitor/control signal processor; and an optical path switch coupled to said divider and said monitor/control signal component generator and connected to said monitor/control signal processor for transmitting first through n-th WDM optical signals comprising said first through said n-th main signal components and said monitor/control signal component from said monitor/control signal component generator, respectively, to said next apparatuses specified by said specifying signal supplied from said monitor/control signal processor, respectively.

* * * * *